United States Patent
Yoon et al.

[11] Patent Number: 6,072,931
[45] Date of Patent: Jun. 6, 2000

[54] FIBER AMPLIFIER PACKAGING APPARATUS

[75] Inventors: Soo-young Yoon, Kunpo; Sung-jun Kim; Seong-teak Hwang, both of Pyeongtaek, all of Rep. of Korea

[73] Assignee: Samsung Electronics Co., Ltd., Kyunoki-do, Rep. of Korea

[21] Appl. No.: 09/124,986

[22] Filed: Jul. 30, 1998

[30] Foreign Application Priority Data

Jul. 31, 1997 [KR] Rep. of Korea ............... 97-36561

[51] Int. Cl.[7] ............................................. G02B 6/00
[52] U.S. Cl. ................................... 385/135; 385/134
[58] Field of Search ........................... 385/88, 92, 134, 385/135

[56] References Cited

U.S. PATENT DOCUMENTS

| | | | |
|---|---|---|---|
| 4,679,896 | 7/1987 | Krafcik et al. | 350/96.2 |
| 4,911,519 | 3/1990 | Burton et al. | 350/96.2 |
| 5,047,835 | 9/1991 | Chang | 385/92 |
| 5,420,957 | 5/1995 | Burek et al. | 385/135 |

FOREIGN PATENT DOCUMENTS

| | | |
|---|---|---|
| 6-283789 | 10/1994 | Japan. |
| 8-327847 | 12/1996 | Japan. |
| 9-55556 | 2/1997 | Japan. |
| 10-84154 | 3/1998 | Japan. |
| 10-133035 | 5/1998 | Japan. |

*Primary Examiner*—Cassandra Spyrou
*Assistant Examiner*—Euncha Cherry
*Attorney, Agent, or Firm*—Leydig, Voit & Mayer

[57] ABSTRACT

A fiber amplifier packaging apparatus for reducing overall volume without damaging an optical fiber. The fiber amplifier packaging apparatus includes a housing on which an optical fiber for input and output of an optical signal is installed, inside of which a fiber amplifier can be located; a clamp for fixing the optical fiber to the housing; an insert including upper and lower plates located inside the housing and spaced apart from each other; a neck between the upper and lower plates; an erbium doped fiber (EDF) wound around the neck; a hollow tube extending through the upper and lower plates and the neck; a clip slipped over the insert so that the EDF does not unwind; and a cover locked to the housing for protecting optical parts located in the housing.

6 Claims, 4 Drawing Sheets

FIBER AMPLIFIER PACKAGING APPARATUS

BACKGROUND OF THE INVENTION

1. Field of the Invention

The present invention relates to a packaging apparatus for packaging a fiber amplifier, and more particularly, to a fiber amplifier packaging apparatus by which it is possible to reduce overall volume without damaging optical parts containing an optical fiber.

2. Description of the Related Art

In general, the fiber amplifier is an apparatus for amplifying light, the power of which is weakened during long distance transmission of information in optical communications, using an optical fiber as a transmission medium. An erbium doped fiber amplifier (EDFA), which is a fiber amplifier widely used for realizing a high speed optical transmission system by removing delay time, directly amplifies light without a photoelectric conversion and an electrooptic conversion. The fiber amplifier is installed between optical fibers which are media for transferring light and are packaged by a packaging apparatus. The packaging apparatus is for protecting optical parts, which form the fiber amplifier, from external shock. The volume of a housing, which is a part of the packaging apparatus is determined according to the sizes and the generation of heat characteristics of the optical parts. Namely, in making the volume of the housing small, the bending loss of the optical fiber increases and the area of the optical fiber increases. Accordingly, heat emitted to the outside is reduced.

Also, excessive force may be inflicted on a connector cable connected to the fiber amplifier when the packaged fiber amplifier is installed or moved. Namely, since the optical fiber in the cable is directly spliced together with the optical parts of the fiber amplifier, the optical fiber can be easily cut by external pressure. Considering this point, in a conventional technology, the tensile strength is increased by processing a connection part using rubber molding. However, in this case, the rubber molding is hardened or damaged due to the changing temperature or long time use.

Also, an insert of the packaging apparatus fixes the optical parts such as an erbium doped fiber (EDF), a wavelength selective coupler (WSC), an optical isolator, and a coupler. In particular, a groove is formed in a part of the insert to fix the EDF to the indent in the conventional technology. When the EDF is fixed to the indent by the above-mentioned method, it is difficult to rearrange the EDF protruding over the insert and the EDF may hang outside of the insert due to sudden impacts or shaking.

SUMMARY OF THE INVENTION

It is an objective of the present invention to provide a small fiber amplifier packaging apparatus in which tensile strength of a spliced together part is increased and an erbium doped fiber (EDF) is easily fixed to an insert.

To achieve the above objective, there is provided a fiber amplifier packaging apparatus comprising a housing in which an optical fiber for input and output of an optical signal is installed, inside of which fiber amplifiers can be located, a clamper for fixing the optical fiber inserted inside the housing, an insert including upper and lower plates located inside the housing and spaced apart from each other so that some optical parts comprising the fiber amplifier can be installed therein, a neck between the upper and lower plates and having erbium doped fiber (EDF) wound around the external part thereof, and a hollow portion extending through the upper and lower plates and the neck, a clip slipped over the insert so that the EDF does not become untied, and a covering portion locked to the housing for protecting the optical parts located in the housing.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
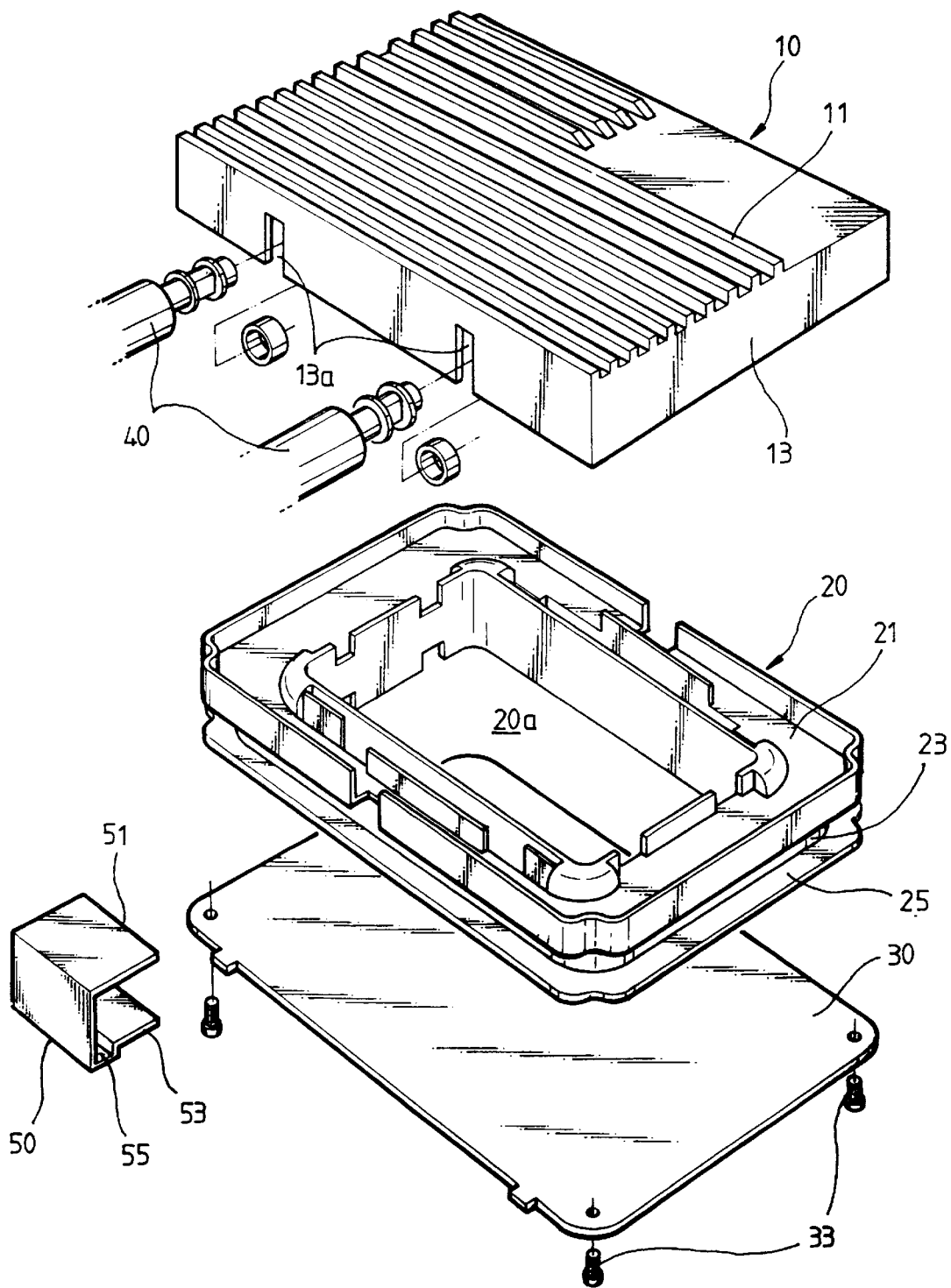
FIG. 1 is a perspective view of a fiber amplifier packaging apparatus according to an embodiment of the present invention.

Referring to FIG. 1, an optical fiber into which an optical signal is input and from which the optical signal is output is installed in a fiber amplifier packaging apparatus according to the present invention. The fiber amplifier packaging apparatus includes a housing 10 inside of which a fiber amplifier is located, a clamper 40 for fixing an optical fiber to the housing 10, an insert 20 on which optical parts including erbium doped fiber (EDF) are installed, a clip 50 for preventing the EDF wound on the insert 20 from becoming untied, and a cover 30 locked to the housing 10.

Figure 2:
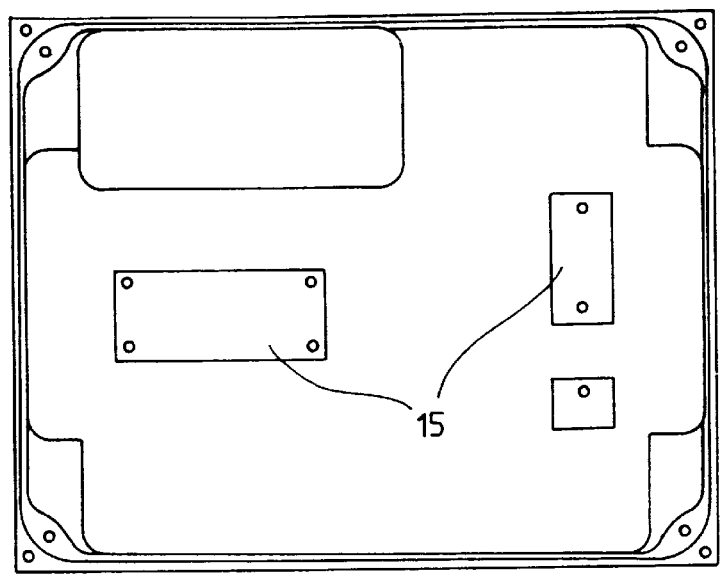
FIG. 2 is a rear view of a housing of FIG. 1.

Referring to FIGS. 1 and 2, the housing 10 is a rectangular parallelepiped, the inside of which is empty and one surface of which is opened so that the insert 20 and optical parts can be installed therein. In order to effectively radiate heat generated by the optical parts installed inside the housing 10, a plurality of heat radiating fins 11 are located on the external part of the upper surface of the housing 10 so as to increase the area subjected to air. An installing portion 15 is formed inside the housing 10 so that a control circuit board (not shown), for controlling the gains of a pumping light source connected to the EDF and an erbium doped fiber amplifier (EDFA), can be installed. Also, a clamper installing groove 13a is located on at least one side wall 13 of the housing 10 so that a clamper 40 including the optical fiber to which an optical signal is input and the optical fiber to which the optical signal is output, a connected to the EDFA may be installed.

Figure 3:
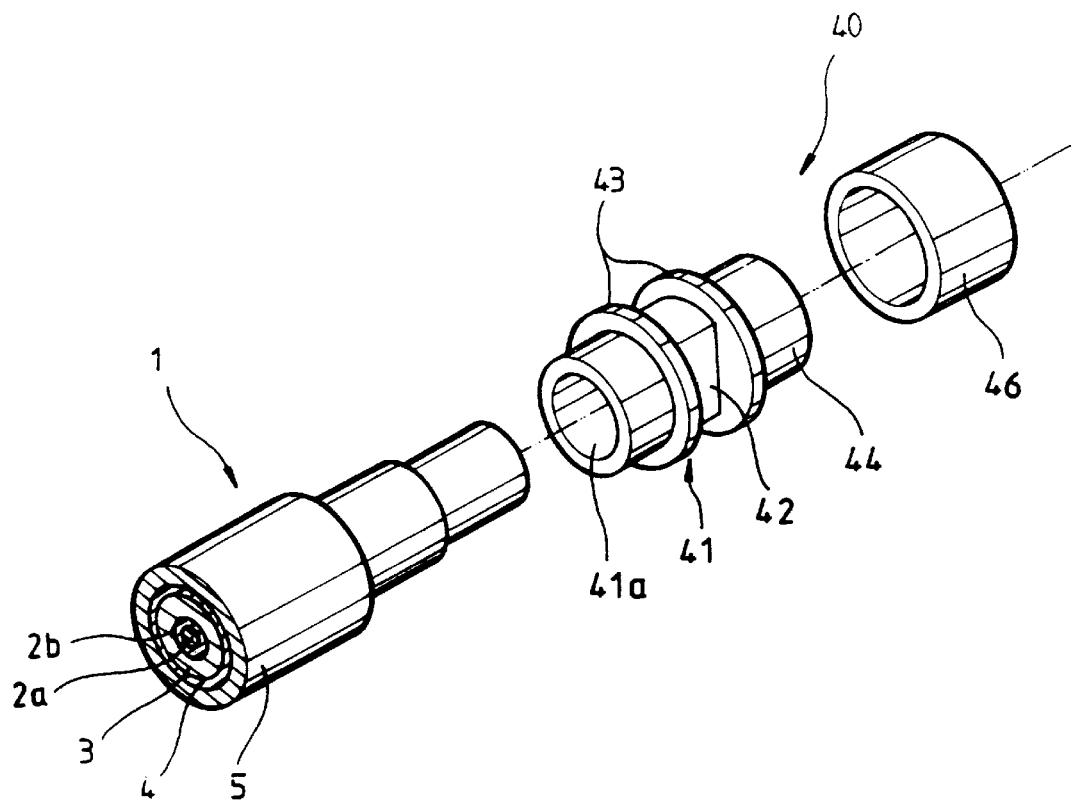
FIG. 3 is a perspective view of a clamper according to the present invention.
Figure 4:
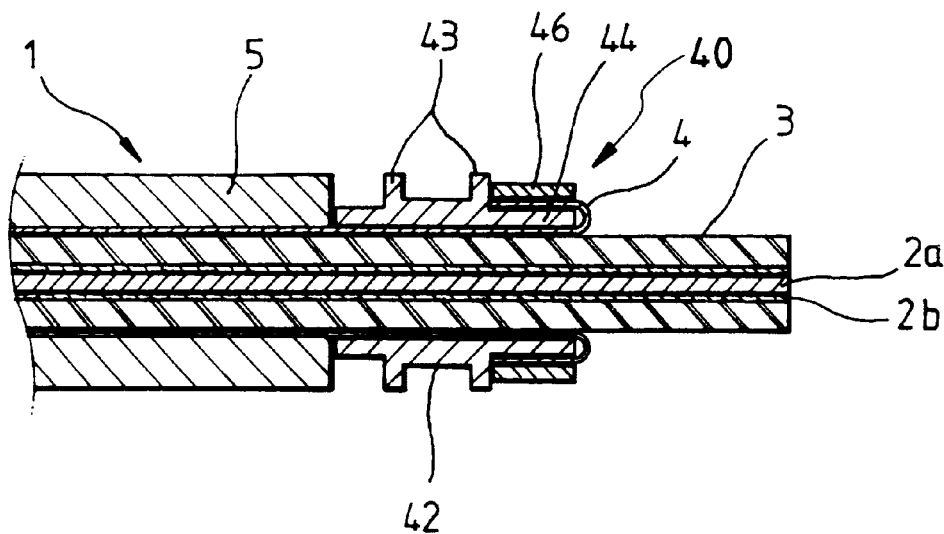
FIG. 4 is a sectional view of FIG. 3.

Referring to FIGS. 3 and 4, the clamper 40 includes a clamp 41 having a tube 41a into which the optical fiber 1 can be inserted and a clamp ring 46 for preventing the optical fiber 1 from moving around. The clamp 41 is also insertable into the clamper installing groove 13a.

The optical fiber 1 inserted into the clamp 41 comprises a core 2a, a clad 2b wrapped around the core 2a and having a refractive index that is different from that of the core 2a, a first covering 3 for wrapping the clad 2b in order to protect the core 2a and the clad 2b, glass fiber 4, and a second covering 5 wrapping the first covering 3 and the glass fiber 4.

The optical fiber 1 having the above structure is inserted into the tube 41a of the clamp 41, with the second covering 5 removed. The clamp 41 includes an installing portion 42 installed in the installing groove 13a, a stopper 43 projecting on the front and rear sides of the installing portion 42 so that the clamp 41 does not move around inside and outside the housing 10, and a combining portion 44 into which the clamp ring 46 is inserted. A part of the installing portion 42 is flat so as to prevent movement inside the installing groove 13a. In the optical fiber 1 inserted into the tube 41a, a part of the glass fiber 4 is separated from the first covering 3 by stripping. The separate part is located on the combining portion 44. The clamp ring 46 has inserted into it the circumference of the combining portion 44, with the glass fiber 4 interposed. Therefore, it is possible to prevent external force from being inflicted on the splicing connected part between the optical fibers by preventing the optical fiber 1 from sliding along a longitudinal direction in the through groove 13a.

Figure 5:
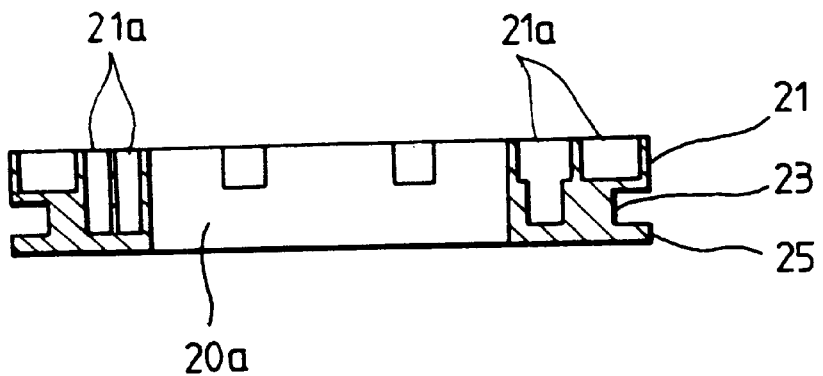
FIG. 5 is a sectional view of an insert according to the present invention.

Referring to FIGS. 1 and 5, the insert 20 includes upper and lower plates 21 and 25, a neck 23, and a hollow portion 20a extending through the upper and lower plates 21 and 25 and the neck 23. The upper and lower plates 21 and 25 have a plurality of grooves 21a located so that optical parts, such as a wavelength selective coupler (WSC), an optical isolator, and a coupler can be installed therein.

The neck 23 is interposed between the upper plate 21 and the lower plate 25 and the edges thereof are rounded. The EDF is easy to install since it is wound on the neck 23.

The clip 50 has a "⊏" shape, as shown in FIG. 1, to slip over the side surfaces of the upper and lower plates 21 and 25. A resilient groove 55 is located on the bottom surface 53 of the clip 50 so that the clip 50 cannot be easily removed from the upper and lower plates 21 and 25, thus preventing the distance between the upper surface 51 and the bottom surface 53 from widening. It is possible to prevent the EDF wound on the indent 20 from being untied by installing the clip 50.

The cover 30 is locked to the opening of the housing 10 by a locking means 33 in order to protect the insert 20 and the optical parts inside the housing 10.

Figure 6:
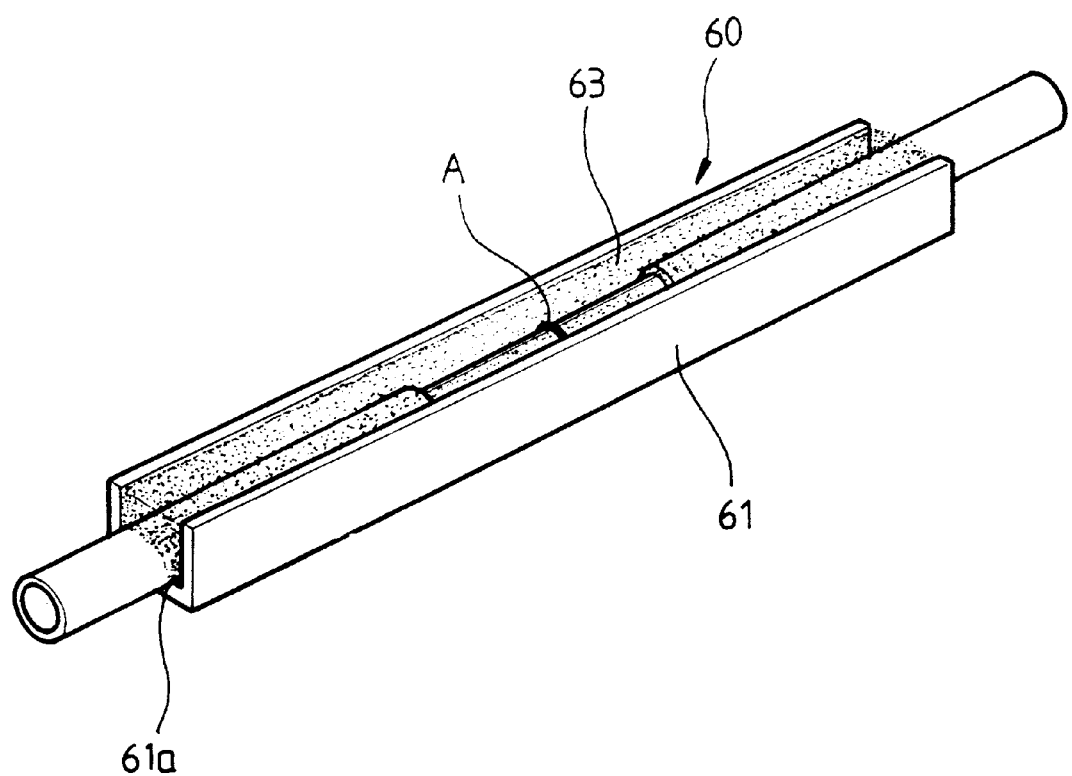
FIG. 6 is a perspective view showing a protector according to the present invention.

In the present invention, it is preferable to further include a protecting portion 60 as shown in FIG. 6 in order to protect the splicing connection part between the EDF and the other optical parts and between the optical parts.

The protecting portion 60 comprises of a protector 61 and adhesive 63 inside the protector 61. The protector 61 is formed in a "⊏" shape in which a groove 61a houses the spliced portion A between the optical parts. The hardening adhesive 63 is supplied to the groove 61a, with the spliced portion A located inside the protector 61. The adhesive is hardened by irradiating it with light, such as ultraviolet rays. It is possible to prevent the spliced portion A from being broken by reinforcing the part using the protector 61 and the adhesive 63.

As mentioned above, in the fiber amplifier packaging apparatus according to the present invention, it is possible to easily wind the EDF by winding the EDF on the external part of the neck 23 of the insert 20 and to prevent the EDF from being untied by slipping the clip over the upper and lower plates 21 and 23. Also, it is possible to prevent the optical fiber from moving in a longitudinal direction by changing the structure of the connector 40 installed in the housing 10. Also, it is possible to prevent the spliced portion from being broken by reinforcement using the protector 61 and the hardening adhesive 63.

It is contemplated that numerous modifications may be made to the packing apparatus for the optical fiber amplifier of the present invention as defined in the following claims.

What is claimed is:

1. A fiber amplifier packaging apparatus comprising:
    a housing for housing an optical fiber for input and output of an optical signal and a fiber amplifier;
    a clamp for fixing the optical fiber inside the housing;
    an insert including upper and lower plates located inside the housing and spaced apart from each other so that optical parts are installed between the upper and lower plates, a neck between the upper and lower plates, and an insert tube extending between the upper and lower plates;
    an erbium doped fiber (EDF) wound around the neck;
    a clip slipped over the insert so that the EDF does not unwind; and
    a cover locked to the housing for protecting optical parts located in the housing.

2. The apparatus of claim 1, wherein
    the housing comprises an upper surface having a plurality of heat dissipating fins and a side wall having a clamp installing groove and projecting from the upper surface;
    the apparatus comprises a pump light source and a circuit board located within the housing; and
    the clamp is installed on the side wall of the housing.

3. The apparatus of claim 2, wherein the clamp comprises:
    a clamp having a clamp tube into which the optical fiber is inserted, the clamp being insertable into the clamp installing groove; and
    a clamp ring for preventing the optical fiber from moving within the clamp tube.

4. The apparatus of claim 3, wherein the clamp comprises:
    an installing portion engaging the clamp;
    a stop preventing the installing portion from moving within and outside the housing; and
    a combining portion receiving the clamp ring.

5. The apparatus of claim 1, wherein the apparatus further includes a protecting portion wrapped around a spliced portion of the optical fiber for preventing the optical fiber from being broken.

6. The apparatus of claim 5, wherein the protecting portion comprises:
    a protector in a "⊏" shape and having a groove into which the spliced portion is inserted; and
    a hardening adhesive hardened by irradiation with light.

* * * * *